METHODS AND APPARATUS FOR RECORDING WELL LOGGING SIGNALS

Filed Dec. 27, 1967 5 Sheets-Sheet 1

William J. Sloughter
John A. Stafford
Jimmy G. Lee
Theodore F. Brunn
INVENTORS
BY Edward M. Roney
ATTORNEY William J. Sloughter
John A. Stafford
Jimmy G. Lee
Theodore F. Brunn
INVENTORS BY Edward M. Roney
ATTORNEY William J. Sloughter
John A. Stafford
Jimmy G. Lee
Theodore F. Brunn
INVENTORS
BY
Edward M. Roney
ATTORNEY William J. Sloughter
John A. Stafford
Jimmy G. Lee
Theodore F. Brunn
INVENTORS
BY Edward M. Roney
ATTORNEY

METHODS AND APPARATUS FOR RECORDING WELL LOGGING SIGNALS

Filed Dec. 27, 1967 5 Sheets-Sheet 5

William J. Sloughter
John A. Stafford
Jimmy G. Lee
Theodore F. Brunn
INVENTORS
BY Edward M. Roney
ATTORNEY United States Patent Office 3,488,659

Patented Jan. 6, 1970

3,488,659

METHODS AND APPARATUS FOR RECORDING WELL LOGGING SIGNALS

Theodore F. Brunn, Jimmy G. Lee, and John A. Stafford, Houston, Tex., and William J. Sloughter, Ridgefield, Conn., assignors to Schlumberger Technology Corporation, New York, N.Y., a corporation of Texas Filed Dec. 27, 1967, Ser. No. 694,008

Int. Cl. G01d 9/42

U.S. Cl. 346—1 16 Claims

ABSTRACT OF THE DISCLOSURE

The particular embodiment described herein as illustrative of the invention describes a recording system for recording well logging signals. Light from a light source is modulated by the well logging signals, the modulated light passing through a rotatable refracting medium and reflecting off of a rotatable reflective means onto a recording medium to make a log of the well logging signals. One of the refracting or reflective means is disabled when the other means is being rotated, the rotatable means causing the modulated light to sweep across the recording medium. Means are provided for automatically synchronizing the sweeping light with a recurrent well logging event so that the recurrent well logging event will correspond with a given position on the recording medium for each sweep of the light across the recording medium.

This invention relates to the recording of well logging signals which are supplied from a downhole investigating apparatus. The invention is especially useful for the recording of well logging signals derived from well logging apparatus which produces a recurrent event at periodic time intervals.

One type of such well logging apparatus is the so-called "sonic logging" apparatus. In the usual sonic logging method, the recurrent well logging event is an acoustic burst of energy transmitted into the earth formations adjoining a borehole from a suitable transmitting transducer. A nearby receiving transducer then converts the received acoustical waves into electrical signals for transmission to the surface of the earth. The transmitter is usually fired at a constant frequency. Usually, both the received signal and the transmitted firing pulse are recorded. One way of recording such well logging signals is to record a variable density log of these signals by utilizing an oscilloscope and oscilloscope camera combination as shown in U.S. Patent No. 3,302,165 granted to T. O. Anderson et al. on Jan. 31, 1967. Although generally acceptable results are obtained, an oscilloscope and oscilloscope camera combination has been found to be an expensive, complicated, and bulky set of equipment.

One novel and highly desirable manner of recording such well logging signals is shown in a copending application Ser. No. 693,818 by Denis R. Tanguy filed Dec. 27, 1967, wherein a glow modulator tube is utilized in conjunction with a rotating mirror to sweep a modulated light beam across a recording medium. The light beam is swept at the frequency of the recurrent energy transmission.

Another logging apparatus that produces such a recurrent event is a so-called "televiewer" apparatus shown in copending application Ser. No. 697,796 by J. E. Chapman filed Jan. 15, 1968. This televiewer apparatus provides for rotating a sensing means, in this case a directional sonic transducer, so as to scan the circumference of a borehole wall while transmitting and receiving acoustic bursts of energy. Thus, in effect, the sensing means makes a spiral through the borehole as the sensing means is moved through the borehole. The transducer signals representing these acoustic bursts of energy are then transmitted to the surface of the earth to be recorded. The recorded signals provide a picture of the borehole wall, and thus the name "televiewer." Azimuth signals are also transmitted to the surface of the earth to provide indications of the recurrent well logging event so that the resulting recorded log can be referenced to the azimuthal directions. One way of recording such well logging signals is to use an oscilloscope, as shown in the Chapman application. However, again, an oscilloscope is an expensive and bulky set of equipment and it would therefore be desirable to record such a log with relatively inexpensive and nonbulky recording equipment. It would also be desirable to record these "televiewer" signals with the same recording apparatus utilized to record other types of well logging signals, such as so-called "sonic" well logging signals.

One manner of providing such nonbulky and inexpensive recording equipment for recording such "televiewer" signals and "sonic" signals is to utilize a rotating mirror and refracting medium in combination with a modulated light source, as shown in copending application Ser. No. 694,009 by J. A. Stafford filed on Dec. 27, 1967. Either the rotatable mirror or refracting medium is rotated so as to sweep modulated light across a recording medium to produce a log of the well logging data.

When utilizing rotating optical means, such as the above-mentioned rotating mirror or refracting medium, for recording well logging signals, it becomes necessary to synchronize the rotation of the rotatable optical means with the above-mentioned recurrent well logging event. One way of doing this, as shown in the copending Stafford application, is to energize the motor which drives the rotatable optical means with a signal whose frequency is proportional to the frequency of the recurrent well logging event. Position synchronization is then provided by observing the image of the recurrent well logging event on a viewing screen and manually adjusting the relative orientation of the motor so as to line up the image of the recurrent well logging event at a selected position on the recording medium.

However, it would be highly desirable to have both the frequency and position synchronization taken care of automatically. Even though the position may be synchronized initially, it is possible that, in the course of recording the well logging signals, the system will get out of position synchronization. This is especially possible if the motor which drives the rotatable optical means has a large number of poles. If the system should get out of position synchronization, it is possible that this out-of-synchronization condition may prevail for a long time period since the logging operator is preoccupied with a great many other duties during the logging operation.

It is an object of the invention therefore to provide new and improved methods and apparatus for recording well logging signals.

In accordance with the well logging recording system of the present invention, methods and apparatus for synchronizing a recording system with a recurrent well logging event comprise generating a light output and sweeping the light in a given path. A light position signal is generated in response to the sweeping light having a given direction and the sweeping light is synchronized with the recurrent well logging event in response to the generated light position signal and a signal representative of the recurrent well logging event.

For a better understanding of the present invention, together with other and further objects thereof, reference is had to the following description taken in connection with the accompanying drawings, the scope of the invention being pointed out in the appended claims.

Referring to the drawings:

FIGURE 1 shows a plurality of investigating apparatus in a borehole along with apparatus for recording well logging signals derived from the various investigating apparatus in accordance with the present invention;

FIGURES 2A–2E graphically represent the operation of various portions of the FIGURE 1 apparatus;

Figure 1:
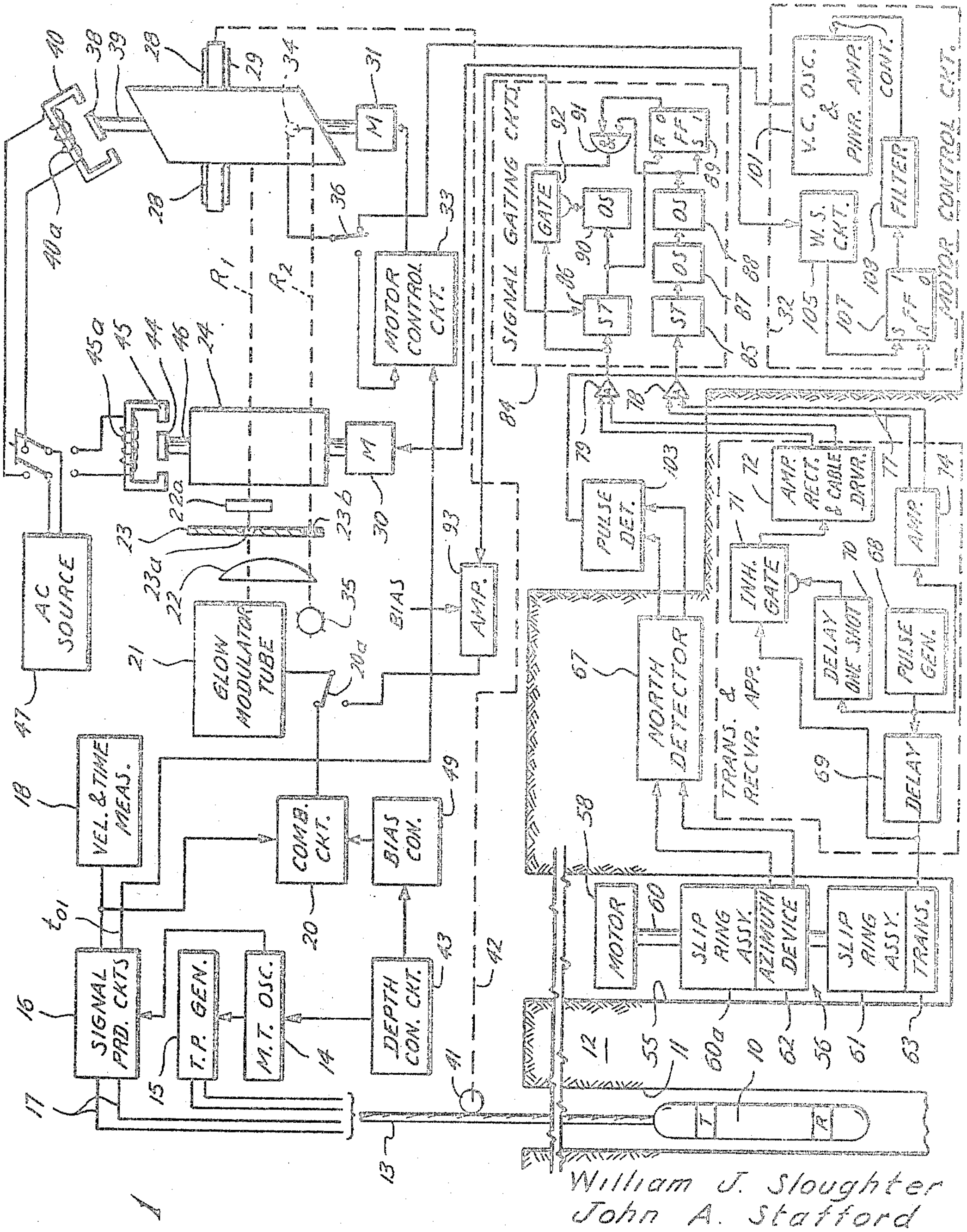

Now referring to FIGURE 1, there is shown a downhole investigating tool 10 disposed in a borehole 11 for investigating earth formations 12. The tool 10 is supported in the borehole 11 on the end of an armored multiconductor cable 13 which is raised and lowered by a suitable drum and winch mechanism (not shown). The tool 10, in this case, is shown to be a sonic logging tool having a transmitter T for periodically transmitting bursts of acoustic energy and a receiver R displaced a suitable distance from the transmitter T for receiving the acoustic energy. Suitable electronic equipment such as amplifiers may be placed in the downhole tool in the usual manner.

Now referring to the circuitry at the surface of the earth for energizing the tool 10 and receiving the well logging signals therefrom, a master timing oscillator 14 having a substantially constant frequency provides timing signals to a transmitter pulse generator 15 which supplies transmitter firing pulses to the transmitter T within the tool 10 via the cable 13. The received signals from the receiver R and the transmitter firing pulse are supplied to the surface of the earth via the cable 13 to suitable signal processing circuits 16 which act to extract the necessary information in the usual manner and apply it to velocity and travel time measurement circuits 18. The output signal from masterd timing oscillator 14 can also be supplied to signal processing circuits 16 for timing purposes. If desired, the master timing oscillator 14 and transmitter pulse generator 15 could be placed downhole.

Now concerning a portion of the recording features of FIGURE 1, the output signal from signal processing circuits 16 is also supplied to a combining circuit 20. The output signal from combining circuit 20 is utilized to modulate the light output of a glow modulator tube 21 which could comprise, for example, a Sylvania GM 514 Glow Modulator Tube. This modulation signal is supplied via a double-pole switch 20*a*. The light from the glow modulator tube passes through a collimating lens 22 which collects the light and passes it through a slit 23*a* in an opaque member 23, which slit has a relatively narrow width, as shown, but a fairly large height (dimension extending into the paper). The light emanating from the slit 23*a* passes through a rotatable refracting medium 24, in the form of a four-sided prism, and is reflected off of a rotatable mirror 25 through a lens 26 (obscured by miror 25) which is disposed relatively close to the mirror 25. The rotatable refracting medium 24 and mirror 25 are driven by suitable motor 30 and 31, which desirably, are synchronous motors, i.e., their shaft speed is proportional to the frequency of the energizing power applied thereto. The light passing through lens 26 is then passed through a cylindrical lens 28 onto a recording medium 29.

This ray of light $R_1$ shown in FIGURE 1 represents, in effect, the light as recording medium 29 would see it, the various lenses acting to focus the light to a point on the recording medium. To accomplish this focusing, the lens 26 has a focal length such as to make an image of the slit 23*a* on the recording medium 29 (forgetting for the moment the action of cylindrical lens 28). Thus, lens 22 establishes the width of the light spot on the recording medium 29. The cylindrical lens 28 establishes the light spot height by focusing the light ray bundle passing through the lens 22 to a given spot height. Thus, a point image is made in the recording medium by this means. A more detailed explanation of this optical system is provided in the aforementioned copending Stafford application.

In operation, the ray of light $R_1$, and thus the image (or light spot) on the recording medium 29 will be swept thereacross as the rotating mirror 25 or rotating refracting medium 24 is rotated by one of the motors 30 or 31 respectively. The motors 30 and 31 are energized by motor control circuits 31 and 32 respectively which supply power to the motors 30 and 31 (only one of which is operational at any given time). The motor control circuits 31 and 32 act to vary a characteristic of the supplied power so as to cause one of the rotating refracting medium 24 or mirror 25 (whichever one is operational) to rotate in synchronism with a recurrent well logging event. Thus, for the case of recording the sonic signals from signal processing circuits 16, the motor control circuit 33 causes the rotating mirror 25 to rotate in synchronism with the indications of the transmission of energy from the transmitter T received at the surface of the earth. This operation will be discussed in more detail later.

In the example depicted in FIGURE 1, the rotating mirror 25 and refracting medium 24 are utilized separately to record well logging signals derived from different types of downhole investigating apparatus. Although it would be possible to utilize the rotatable refracting medium to record both the well logging signals from signal processing circuits 16 and from the downhole televiewer apparatus (not yet discussed), the sweep frequency (i.e., the frequency at which the light spot is swept across the recording medium) will usually not be the same for both applications. Thus, different motors may be required for each application.

To avoid having to manually change motors or gears when different sweep frequencies are used, both the rotatable mirror 25 and refracting medium 24 are left in the optical system of FIGURE 1. When the rotatable mirror is utilized as the sweeping means, the rotatable refracting medium is held at a fixed position, and vice versa when the refracting means is utilized as the sweeping means. To hold the rotatable mirror 25 at a fixed angular position, a longitudinally extending magnetic member 38 is fixed transversely to a shaft 30 which is connected to the rotatable mirror 25. A bent magnetic member 40 adapted to be energized by a coil 40*a*, forms a magnetic path with the magnetic member 38 so that when the coil 40*a* is energized, the magnetic member 38 will line up in a specified direction in response to the applied magnetic force. The rotatable refracting medium 24 has a similar arrangement with magnetic members 44 and 45, coil 45*a*, and shaft 46. To selectively energize coils 40*a* and 45*a*, an AC power source 47 is supplied to the common contacts of a double-pole, double-throw switch 48, the switching contacts of which are supplied individually to coils 40*a* and 45*a*.

The signals modulating glow modulator tube 21, as will be explained later, provide a variable density trace of the well logging measurements on the recording medium 29. However, since the rate at which the tool 10 travels through the borehole cannot always be constant and thus the rate of travel of recording medium 29 cannot always be constant, a depth control circuit 43 is provided. This depth control circuit is responsive to the movement of the cable 13, through the action of a rotating wheel 41 and shaft 42, and the output pulses from master timing oscillator 14 for energizing a bias control circuit 49 at the proper time. The bias circuit 49 supplies a negative voltage to the combining circuit 20 until it is desired to record a well logging signal from signal processing circuits 16. During the time when the trace is being recorded on recording medium 29, bias control circuit 49 supplies a bias voltage of a given desired positive value to the combining circuit 20. This combining circuit could take the form of a switching circuit, like a relay, for example. Thus, a trace of the well logging signals from signal processing circuits 16 at equal depth intervals is provided by this arrangement. A typical arrangement of this depth control circuit can be found in U.S. Patent No. 3,333,237 granted to J. E. Chapman III on July 25, 1967.

Figure 2A:
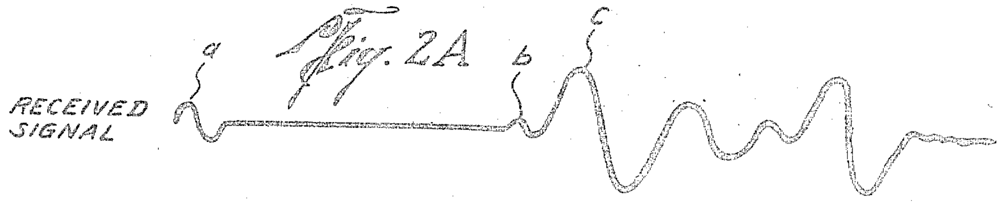
Figure 2B:
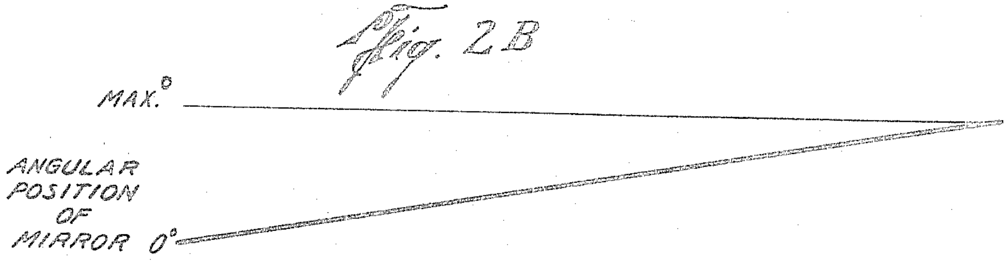

Referring to FIGURES 2A–2E to gain a better understanding of how the well logging signals from signal processing circuits 16 are recorded, FIGURE 2A shows the signals supplied from the signal processing circuits 16. The first portion of this signal (on the left-hand side), designated *a*, is the transmitter firing pulse received at the surface of the earth and the later arriving signals (on the right-hand side) is the signal received at the surface of the earth which was picked up by the receiver R in the tool 10. FIGURE 2B shows a plot of the angular position of the rotating mirror 25 as a function of time. If the mirror 25 is rotating at a substantially constant angular velocity, the time axis can also be considered to represent the width of the recording medium 29. That is to say, as the rotating mirror rotates from 0° to the maximum angular position, the beam of light is swept from one side of the recording medium to the other (or one side of a recording track to the other).

Figure 2C:
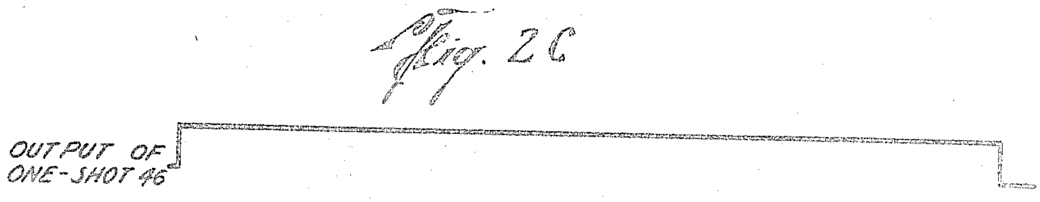
Figure 2D:
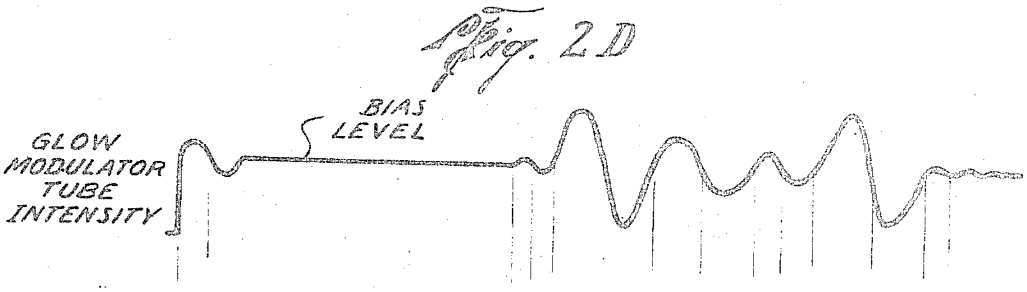

FIGURE 2C shows the output wave form from depth control circuit 43 which causes the bias control circuit 49 to bias the glow modulator tube 21 to the proper bias level to allow modulation thereof by the signal of FIGURE 2A. FIGURE 2D shows the intensity of light emitted by the glow modulator tube 21. It can be seen that the intensity goes from zero to the bias level in coincidence with the energization of bias control circuit 49 (FIGURE 2C). This bias level is selected so that the bias level itself will produce a faintly visible trace, if any, on the recording medium 29, but a modulation voltage above this bias level will leave a definite visible trace, the greater the modulation voltage the darker the trace.

Figure 2E:
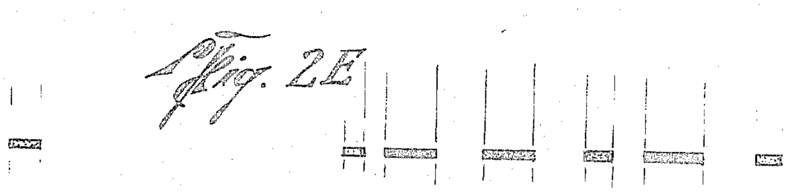

The signal of FIGURE 2A then modulates the light intensity output of the glow modulator tube with respect to this bias level, as represented in FIGURE 2D. It can be seen that the greater the positive magnitude of the modulation voltage, the greater will be the light intensity output of glow modulator tube 21. Referring to FIGURE 2E, there is shown the resulting trace on the recording medium 29 due to this modulation of glow modulator tube 21. Since the amplitude of the modulation voltage of FIGURE 2A causes the light intensity output of the glow modulator tube 21 to vary, the traces of FIGURE 2E on the recording medium 29 will vary in density as a function of this amplitude variation. This can be seen by comparing FIGURE 2A or 2D wtih FIGURE 2E.

Figure 3:
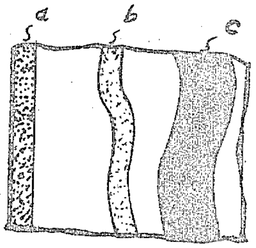
FIGURE 3 represents a typical example of how the recording medium shown in the FIGURE 1 apparatus might look, after developing, when recording signals from one of the investigating apparatus of FIGURE 1.

Referring to FIGURE 3, there is shown an example of how the recording medium (or film) might look after developing. The traces on the left-hand side, designated *a*, corresponds to the similarly designated transmitter firing pulse of FIGURE 2A. Likewise, the plurality of traces designated *b* and *c* correspond to the similarly designated portions of the received signal of FIGURE 2A. (It is to be understood that FIGURE 2A represents one trace across the recording medium while FIGURE 3 represents a plurality of traces). It can be seen that the density or darkness of the trace corresponds to the amplitude of the respective wave shape.

Now concerning the "televiewer" investigating apparatus, there is shown to the right of the borehole 11 another borehole 55 having a representative borehole televiewer apparatus 56 for scanning the wall of the borehole 55. The televiewer apparatus 56 includes a suitable motor 58 which drives a shaft 60 at a relatively constant angular velocity. This motor 58 could comprises a synchronous AC motor energized by power supplied from the surface of the earth, or could be a suitable DC motor, for example. Mounted on the shaft 60 are slip ring assemblies 60 and 61 which allow an azimuth device 62 and acoustical transducer 63 to be rotated without losing electrical contact with the electronic cartridge portion of the downhole apparatus. This electronics cartridge is, in reality, above the scanning apparatus shown in FIGURE 1 but is shown to the right thereof for purposes of clarity of the electrical schematic.

This downhole electronic circuitry comprises a transmitter and receiver apparatus 65 for energizing the acoustical transducer 63 at a 2 megacycle rate and receiving the resulting acoustical signal resulting therefrom along with apparatus for supplying a transmitter timing pulse and receiver signals to the surface of the earth. The downhole electronics also includes a north azimuthal detector 67 which is connected to the azimuth device 62 and supplies a pulse to the surface of the earth via a conductor pair 66 every time the scanning apparatus passes magnetic north.

Figure 4A:
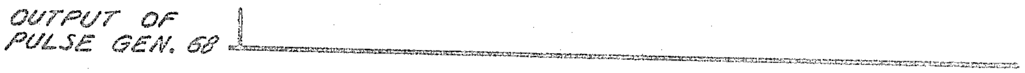
FIGURES 4A–4F represent graphically voltage wave forms at various points in a downhole portion of the FIGURE 1 apparatus.
Figure 4B:
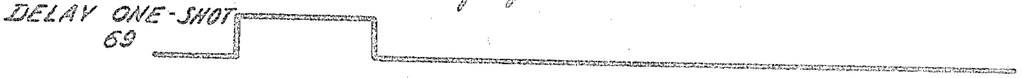
Figure 4C:
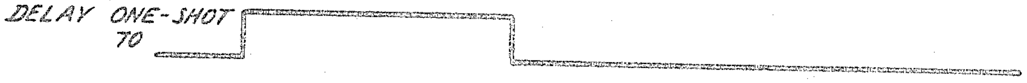
Figure 4D:
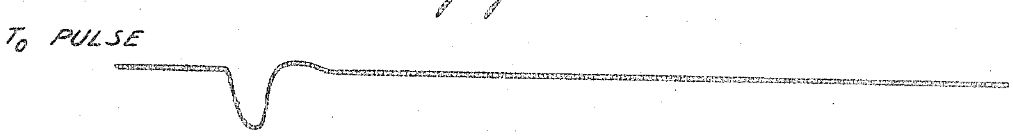
Figure 4E:
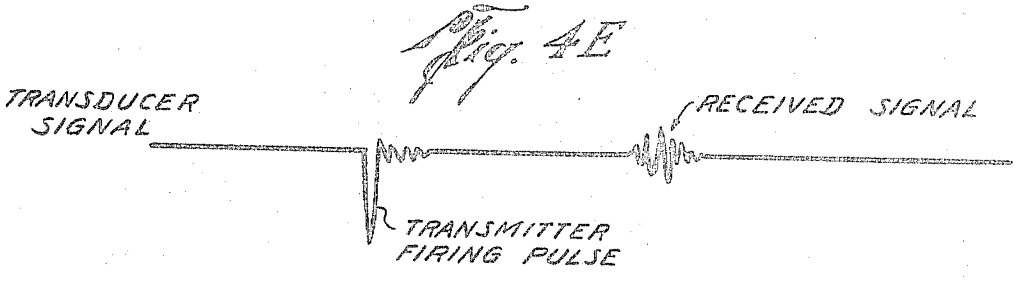
Figure 4F:
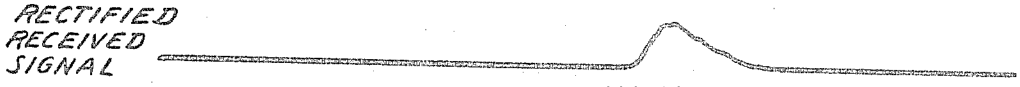

Now concerning the operation of this downhole electronics and first considering the transmitter and receiver apparatus 65, refer to FIGURES 1 and 4A–4F in conjunction. A pulse generator 68 generates the pulses shown in FIGURE 4A (designated transmitter timing pulse $T_0$) at a rate of, for example, 2 kilocycles per second. These pulses are delayed by a delay circuit 69 which could comprise for example a one-shot and another pulse generator responsive to the lagging edge of the one-shot output pulse. The on-time of the delay one-shot 69 is shown in FIGURE 4B and the delayed transmitter firing pulse is shown in FIGURE 4E. The output pulses from pulse generator 68 also energize a delay one-shot 70 whose wave form is shown in FIGURE 4C. The output of delay one-shot 70 energizes an inhibit gate 71 which when unenergized, passes the receiver signals picked up by transducer 63 to an amplifier-rectifier and cable driving circuit 72. The rectifier portion of circuit 72 acts to detect the modulation envelope of the received 2 megacycle burst of acoustic energy. The energization of inhibit gate 71 by delay one-shot 70 insures that the high energy transmitter firing pulses will not reach the amplifier-rectifier and cable driver 72, which is designed to be sensitive to the low energy received signals. The rectified output signal from circuit 72, shown in FIGURE 4F, is supplied to the surface of the earth via a conductor pair 76. The output pulses from pulse generator 68 are supplied to the surface of the earth via an amplifier and pulse stretcher circuit 74 and conductor pair 77. These pulses, designated transmitter timing pulses $T_0$, are used for timing purposes in the surface electronics since their amplitude can be made sufficiently large to enable relatively reliable detection thereof, while the receiver pulse amplitude is generally not too great.

Now, concerning the circuitry at the surface of the earth for receiving these well logging signals, the transmitter timing pulses $T_0$ and receiver signals on conductor pairs 77 and 76 are amplified by a pair of amplifiers 78 and 79 respectively and applied to signal gating circuits 84. Signal gating circuits 84 act to accurately select the receiver signals for application to the glow modulator tube 21.

Figures 5A, 5B, 5C, 5D, 5E, 5F, 5G, 5H:
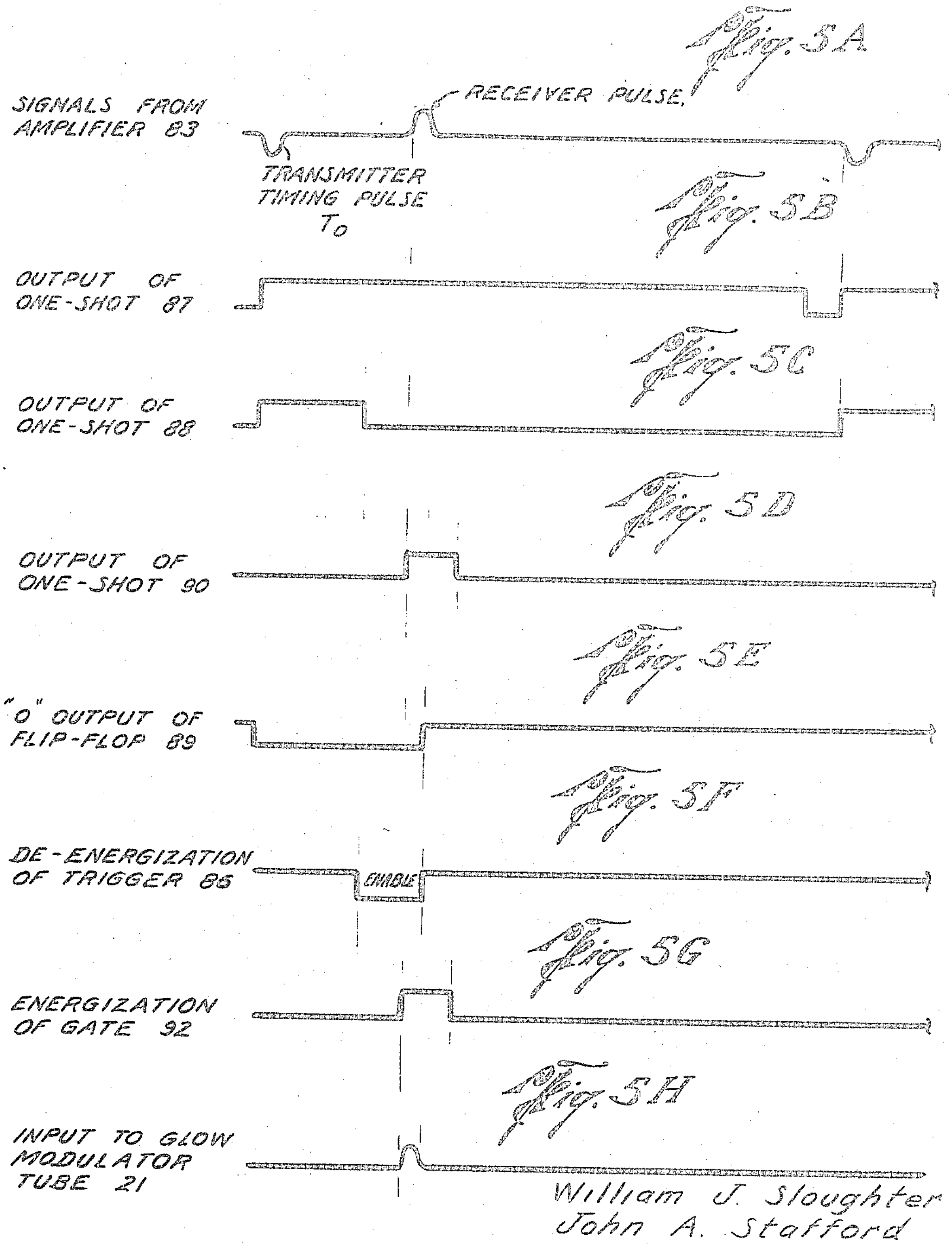
FIGURE 5A–5H represent graphically the voltage wave forms at various points in a portion of the FIGURE 1 surface apparatus.

Now referring to FIGURES 5A–5H in conjunction with the signal gating circuits 84 of FIGURE 1, the transmitter timing pulse $T_0$ and receiver signals received at the surface of the earth are separately applied to a pair of Schmitt triggers 85 and 86 respectively. These signals supplied to Schmitt triggers 85 and 86 are shown in FIGURE 5A as positive polarity for the receiver pulse and negative polarity for the transmitter timing pulse $T_0$. The Schmitt triggers 85 and 86 both generate positive pulses when energized. The output pulses from the transmitter pulse responsive Schmitt trigger 85 energize a one-shot 87 whose output wave form is shown in FIGURE 5B. The "on-time" of one-shot 87 is set slightly less than the minimum expected time period between transmitter firings. The leading edge of the output pulse from one-shot 87 energizes a second one-shot 88 whose output wave form is shown in FIGURE 5C. The "on-time" of one-shot 88 is set slightly less than the minimum expected time period between the transmitter timing pulse $T_0$ and the receiver pulse. The leading edge on the output pulse from one-shot 88 energizes the set input of a flip-flop 89 whose output wave form is shown in FIGURE 5E.

Now, when the Schmitt trigger 86 detects a positive receiver pulse, it generates a positive pulse of short time duration which energizes a one-shot 90, whose output wave form is shown in FIGURE 5D. The trailing edge of the detected receiver pulse resets the flip-flop 89, as seen by comparing FIGURES 5A and 5E. It can thus be seen by comparing FIGURES 5A, 5C and 5E, that the output wave form of the "0" output of flip-flop 89 will go to "0" when a transmitter timing pulse $T_0$ is received and will go to "1" on the trailing edge of the detected receiver pulse. The "0" output of flip-flop 89 and the output from one-shot 88 are supplied to the input of an AND gate 91 whose output, when in the "1" or "on" state (shown in FIGURE 5F) acts to de-energize the receiver pulse responsive Schmitt trigger 86. The output of one-shot 90 energizes a gate 92, (shown in FIGURE 5G) thus passing the receiver pulse output from amplifier 83 to an amplifier 93 to which is added the desired constant bias voltage. The output from amplifier 93 is then supplied to the other terminal of the switch 20*a* for modulation of the light output of glow modulator tube 21. This receiver pulse, which is supplied through gate 92 to glow modulator tube 21, is shown in FIGURE 5H.

It can be seen that, by providing the one-shots 87 and 88 in series and making the on-time of one-shot 87 slightly less than the minimum anticipated time interval between transmitter timing pulses $T_0$, the one-shot 88, and thus the flip-flop 89, will only be energized once for each transmitter pulse. Thus, the receiver pulse responsive Schmitt trigger 86 will only be enabled once per transmitter firing. Since the on-time of one-shot 88 is slightly less than the time between the transmitter timing pulse $T_0$ and the corresponding receiver pulse, the Schmitt trigger 86 will be disabled prior to the arrival of the receiver pulse, but will be enabled in time for the receiver pulse since one-shot 88 becomes deenergized before the receiver pulse arrival. Schmitt trigger 86 will then be immediately disabled due to the flip-flop 89 resetting in response to the trailing edge of the detected receiver pulse. As discussed above, the timing of these circuits insures that the correct pulse is supplied to glow modulator tube 21, thus substantially eliminating erroneous detection of noise as receiver pulses.

The foregoing discussion of the televiewer apparatus was to provide an understanding of the nature of this type of well logging signals so that the requirements of the recording system to be used in conjunction therewith can be better understood. A more elaborate form and more detailed explanation of this televiewer apparatus is contained in the above-mentioned copending Chapman application.

Now, to record the televiewer signal of FIGURE 5H from signal gating circuits 84, the rotating mirror 25 is held at a designated fixed angular position by placing the double-throw switch 48 in the proper position. Then, to record the televiewer signals, the rotating refracting medium 24 is caused to rotate by energizing the motor 30 from the motor control circuit 32 in synchronism with the rotation of the transducer 63 in the tool. As the refracting medium 24 is rotated, the modulated light from glow modulator tube 21 will be recurrently swept across the recording medium 29.

Figure 6:
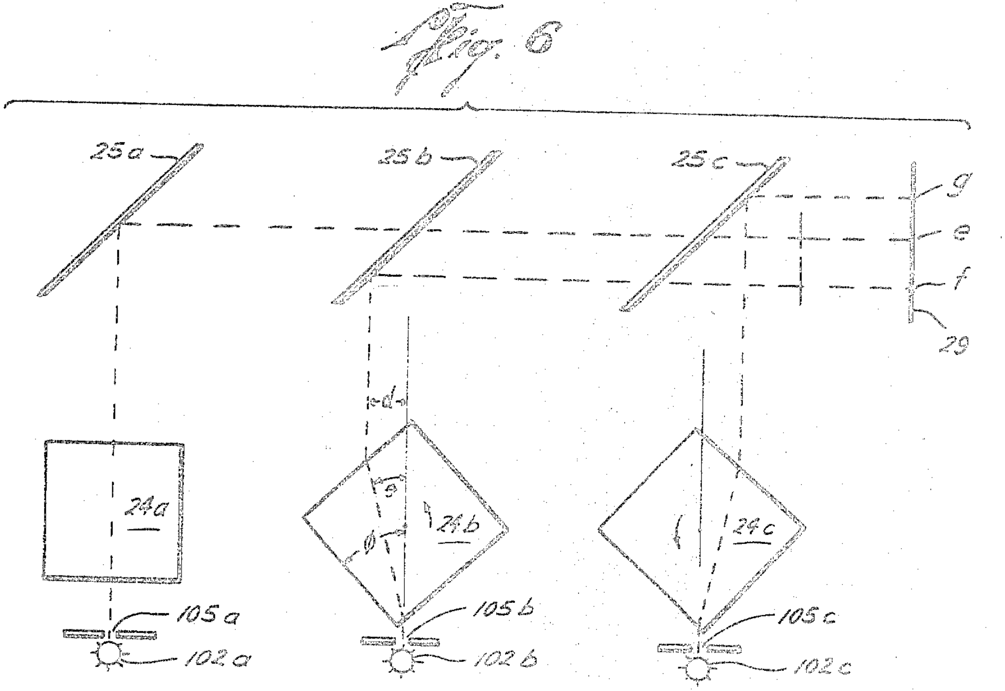
FIGURE 6 represents graphically the operation of a portion of the optical features of the FIGURE 1 apparatus.

Before proceeding with the discussion of how the motor 30 is driven as a function of the rate at which the downhole televiewer apparatus 56 is scanning the wall of the borehole, it would first be desirable to explain how the rotating refracting medium 24 causes the modulated light of glow modulator tube 21 to sweep across the recording medium 29. Referring now to FIGURE 6, there is shown the rotating refracting medium 24 at three separate angular positions to explain how the refracting medium 24 causes the light to recurrently sweep across the recording medium. The refracting medium is designated 24*a*, 24*b*, and 24*c* for each of its three angular positions. The rotating mirror 25 is shown in three separate positions, designated 25*a*, 25*b*, and 25*c* to correspond with the three positions of the refracting medium. There are also shown point light sources 102*a*, 102*b*, and 102*c* for demonstration purposes, and a light ray passing from each point light source through slits 105*a*, 105*b*, and 105*c* and refracting mediums 24*a*, 24*b*, and 24*c* to the recording medium 29. (Again, the single ray of light represents the light the way that recording medium 29 sees it.)

First considering the refracting medium 24*a* which shows it in a straight away position, i.e., having one of its faces perpendicular to the light ray emanating from the slit 23*a*, it can be seen that the light ray (dotted line) passes through the prism 24*a* in an unaltered fashion and is reflected off of the mirror 25*a* onto the recording medium 29 at the point *e*.

Now referring to the refracting medium 24*b* which represents the situation where the refracting medium has rotated an angle $\phi$ in a counterclockwise direction. The light ray is then deflected by an angle $\theta$ by the refracting medium and emerges therefrom in a direction parallel to the path the light ray would have taken had the refracting medium not been present, and displaced a distance $d$ therefrom. This displaced light ray is then reflected off of the mirror 25*b* and impinges on the recording medium 29 at the point designated *f*.

The displaced distance $d$ which the light ray is deflected by the refracting medium is a function of the index of refraction of the refracting medium and the surrounding medium (air in this case), the dimensions of the refracting medium, and the angle of rotation $\phi$. Since $\phi$ is the only variable here, it can be seen that the position of the light spot on the recording medium 29 will be a function of the rotation of the refracting medium.

Now referring to the refracting medium 24*c*, there is shown the rotating refracting medium after it has rotated counterclockwise a slight amount beyond the angular position represented by the refracting medium 24*b*. It can be seen that, in this case, the light ray is deflected in the opposite direction from the direction represented by refracting medium 24*b*. This light ray then is deflected off of the mirror 25*c* onto the recording medium 29 at the point designated *g*.

Thus, in operation, the rotating refracting medium 24 causes the light ray to sweep across the recording medium 29 in the direction indicated by the arrow and upon reaching the far side of the recording medium at the point *f*, is immediately deflected back to the starting point *g* to begin the sweep again. The light spot will be swept across the recording medium 4 times for each revolution of the rotatable refracting medium. Thus, it can be seen that the rotating refracting medium will cause the beam of light to continuously sweep across the recording medium without any delay between the end of one sweep and the beginning of the next.

Now, referring back to FIGURE 1, it will be explained how the rotation of the rotating refracting medium 24 is synchronized with the rotation of the downhole televiewer apparatus 56. This synchronization is provided by utilizing the azimuth pulses which are generated from the north detector circuit 67 each time the directional sensing means of the downhole investigating apparatus 56 is pointed toward magnetic north. These azimuth pulses are supplied to a suitable pulse detector 103. The pulse detector 103 suitably includes a discriminating amplifier which is responsive to only the azimuth pulses, thus eliminating noise, and a suitable wave-shaping circuit, such as a Schmitt trigger, for squaring up the azimuth pulses received at the surface of the earth. These azimuth pulses are then supplied to the motor control circuit 32 for synchronizing the rotatable refracting medium motor 30 with the received azimuth pulses.

To provide power to the motor 30, a voltage controlled oscillator 101 desirably generates sinusoidal signals which are applied to the motor 30 via a power amplifier 100. There are several considerations in selecting the center frequency of this oscillator 101, namely, the number of poles of the motor 30 as well as any gearing between the motor 30 and the shaft which drives the rotating refracting medium 24. Also, it is to be remembered that the rotating refracting medium 24 makes one-quarter of a revolution for each sweep across the recording medium 29, which must be taken into account in determining this center frequency. Of course, if the refracting medium 24 were other than a four-sided prism, the center frequency of oscillator 101 would change correspondingly. At any rate, the frequency of oscillator 101 may well be somewhat higher than the frequency of the azimuth pulses.

To control the frequency and phase of oscillator 101 in accordance with the azimuth signals, a photocell 34 is positioned on the recording medium side of the rotatable mirror 25 in a position to intercept light emitted from a constant intensity light source 35 located directly below the glow modulator tube 21. The light ray $R_2$ emitted by constant intensity light source 35 passes through the lens 22, a slit 23_b_ in the opaque member 23, the refracting medium 24, and is reflected off of the rotatable mirror 25. The slit 23_b_ is desirably square or circular shaped, unlike the slit 23_a_ which is rectangular shaped. Thus, when either the rotatable refracting medium 24 or mirror 25 is utilized to sweep the modulated light from glow modulator tube 21 across the recording medium 29, the constant intensity light ray $R_2$ will follow in a parallel manner, being directly under the modulated light ray $R_1$. The focusing action of lens 22 keeps the constant intensity light ray $R_2$ from reaching the recording medium 29.

Photocell 34 is positioned so as to generate an electrical signal whenever the light ray $R_2$, and thus the modulated light ray $R_1$, has a direction corresponding to the image or light spot on recording medium 29 being at a specified position. This specified position corresponds in some relationship with the recurrent well logging event. Thus, for recording both the televiewer and sonic signals, it is desirable that the recurrent well logging events (azimuth signals and transmitter pulse respectively) coincide with the modulated light image being at the left-hand edge of the recording medium. However, for ease of construction of the motor control circuit 32, the photocell 34 has been positioned at a point midway across the width of the recording medium 29, i.e., 180° out-of-phase with the left-hand edge of the recording medium 29. Thus, for synchronism, the position signals generated from photocell 34 will be 180° out-of-phase with the azimuth signals.

The "position " pulses from photocell 34 are supplied via a double-throw switch 36 to a suitable wave-shaping circuit 105, such as a Schmitt trigger to square up these signals. The resulting output signals from circuit 105 are supplied to the set input of a flip-flop 107. Flip-flop 107 is responsive to the positive going edges of the signals applied thereto. The azimuth pulses from pulse detector 103 are supplied to the reset input of flip-flop 107. Thus, the "on-time" of the output signal from flip-flop 107 is representataive of the time relationship of the position signals from photocell 34 and the azimuth signals. The "1" output from flip-flop 107 is supplied to a suitable filter 108 which acts to convert this time relationship to a DC control signal proportional to the frequency and phase difference between the azimuth and position signals. This DC control signal then acts to vary the frequency and phase of the voltage controlled oscillator 101 so as to provide a relatively fixed time relationship between the azimuth and position signals, and thus synchronize the sweep of the modulated light with the rotation of the downhole sensing means. This control of oscillator 101 could take the form of, for example, varying the reactance of a varicap in the timing circuit of the oscillator 101.

Figure 7A:
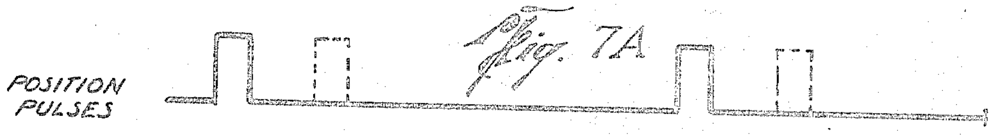
FIGURES 7A–7D represent graphicaly the voltage wave shapes in a certain other portion of the FIGURE 1 apparatus.
Figure 7B:
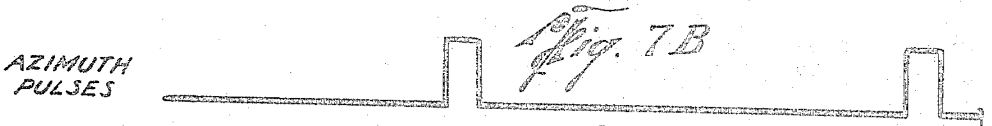
Figure 7C:
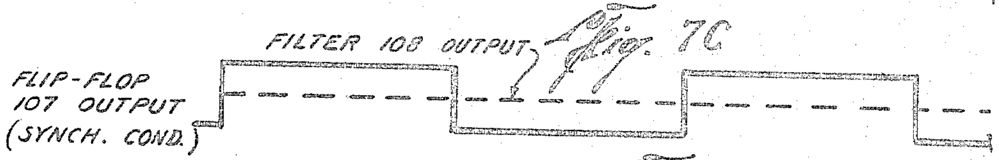

Referring now to FIGURES 7A–7D, there is shown a plot of the wave forms at various points in the motor control circuit 32 for purposes of better explaining the operation of this network. FIGURE 7A shows the position pulses from wave-shaping circuit 105 and FIGURE 7B shows the azimuth pulses which are applied to the reset input of flip-flop 107. FIGURE 7C shows the output wave form (solid line) of the flip-flop 107 in response to the signals of FIGURES 7A and 7B. Remembering that flip-flop 107 is responsive to the positive going edges of the pulses applied thereto, it can be seen in FIGURE 7C that the flip-flop 107 is turned on in response to the leading edge of the position pulses of FIGURE 7A and is turned off in response to the leading edge of the azimuth pulses of FIGURE 7B. The filtered output signal from filter 108 resulting from this output signal from flip-flop 107 is the dotted line signal in FIGURE 7C and is used to control the frequency of oscillator 101. This condition represented in FIGURE 7C is the synchronization condition.

Figure 7D:
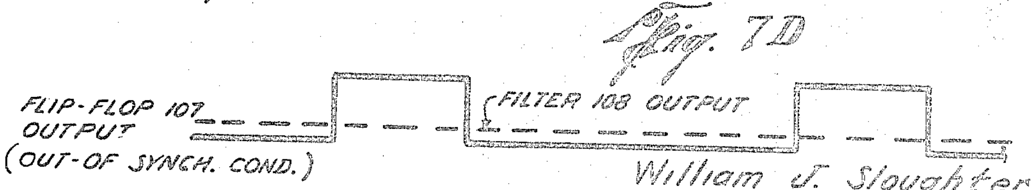

Now consider what happens when the phase of the position pulses becomes out-of-synchronization with the azimuth pulses, as represented in FIGURE 7A by the dotted line wave form. Referring to FIGURE 7D, there is shown the output wave form from flip-flop 107 and the resulting DC control signal applied to oscillator 101 in response to this out-of-synchronization condition. It can be seen that the resulting wave form from flip-flop 107 has a substantially reduced on-time which also substantially reduces the amplitude of the DC control signal. This lower DC control signal then changes the phase of the oscillator output signal to bring the position pulses back into phase synchronization with the azimuth pulses, i.e., 180° out-of-phase with respect to each other. This, then, insures that the modulated light beam will be at the proper position on the recording medium 29 each time an azimuth pulse is received.

The same principle applies if the frequency of the azimuth and position pulses become out-of-synchronization. Thus, assume the frequency of the azimuth pulses decreases, thus causing the azimuth pulses to move further to the right in FIGURE 7B. In this event, the on-time of flip-flop 107 will begin increasing, thus increasing the DC control signal to oscillator 101. This then will increase the capacitance of the varicap (if a varicap is used) in the oscillator timing circuit, thus decreasing the oscillator output frequency until the frequency of the azimuth pulses and the scaled-down oscillator frequency are substantially equal. The same thing will happen in reverse if the frequency of the azimuth pulses increases with respect to the scaled-down oscillator frequency.

Thus, it can be seen that the rotation of the refracting medium 24 will be synchronized in frequency and phase with the rotation of the downhole investigating apparatus 56 so that the beam of light from glow modulator tube 21 will be swept across the recording medium 29 in frequency and phase (or position) with the scanning of the borehole wall.

Figure 8:
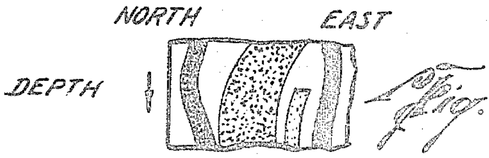
FIGURE 8 shows a typical example of how the recording medium of FIGURE 1 might look, after developing, when recording signals derived from another one of the downhole investigating apparatus shown in FIGURE 1.

Referring to FIGURE 8, there is shown a typical example of how a portion of the recording medium 29 might look, after developing, when recording these televiewer signals. Since the transmitter T is fired a great many times per scan or revolution around the borehole (perhaps several thousand times), the interval between spots on the recording medium may be substantially undiscernible provided the voltage level of the receiver pulses is high enough. The greater in magnitude these receiver pulses, the denser will be the recording and vice versa. The length of the recording medium is referenced to depth and the width is referenced to azimuthal directions, i.e., north, east, etc. Thus, it can be seen that a continuous log of the circumferential investigation of the borehole is provided.

Now concerning the synchronization of the rotating mirror 25 with the transmitter timing pulses from signal processing circuits 16, these timing pulses are designated $t_{01}$ to distinguish them from the transmitter timing pulses discussed earlier in connection with the televiewer apparatus. When recording the sonic well logging signals in variable density form as discussed earlier, the switch 36 is placed in the other position so as to supply the position signals to the motor control circuit 33, which is substantially the same as the motor control circuit 32. The motor control circuit 33 will however be different from the circuit 32 in that the frequency of rotation of the rotating mirror 25 is different from that of the refracting medium 24, in this example. Additionally, since there is a dead time between sweeps across the recording medium 29 when using the rotating mirror 25, the on-time—off-time ratio of the output of flip-flop 107 in motor control circuit 33 will not be 50–50 for synchronization. However, this can be easily accounted for by selecting the proper time constant for the filter 108 of motor control circuit 33. Alternatively, a second photocell could be utilized for operation with the motor control circuit 33 or the one photocell 34 could be positioned at the left-hand edge of the recording medium 29 (i.e., in phase with both recurrent well logging events) and suitable electronic circuitry utilized to control the rotating of the rotatable mirror and refracting medium.

It can therefore be seen that with the apparatus of the present invention, a relatively simple and inexpensive means has been provided for recording measurements obtained from a bore hole scanning type of investigating apparatus such as the televiewer apparatus as well as measurements obtained from the typical sonic logging apparatus. This recording operation can accurately be carried out in synchronism with the scanning of the borehole wall or the transmission of energy into the formations through the action of the motor control circuits 32 and 33 which are responsive to position signals generated from the photocell 34 and recurrent well logging event signals to control the sweep rate across the recording medium. By placing the photocell 34 on the recording medium side of the rotatable mirror 25, any orientation error in the disabled rotatable optical means 24 or 25 will be corrected automatically by the motor control circuits 32 or 33.

If desired, the photocell 34 could be responsive to the modulated light beam thus eliminating the constant intensity light source 35. In this connection, since a photocell can be made to be more light responsive than the recording medium 29, the bias level applied to glow modulator tube 21 could provide sufficient light intensity to trigger the photocell. (For variable density sonic recording, then, a positive bias level could be used at all times.)

It will be appreciated that as the modulated light intensity of the glow modulator tube varies, the light output will have a changing color with changes in its output light intensity. Thus, a color sensitive filter means 22a (in FIGURE 1) could be located in a position to filter out light of a given color passing to the recording medium. This would have the effect of preventing the light output of the glow modulator tube due to the bias level from producing a recordable image on the recording medium. Additionally, a light source could be arranged to reflect light off of the back side of the rotatable mirror 25 to a photocell located on the opposite side of the mirror than shown in FIGURE 1. Likewise, a light source could be situated to pass light transversely to the modulated light passing through the refracting medium 24, to a photocell located on the opposite side of the refracting medium 24.

It is to be understood that downhole investigating apparatus other than that shown in FIGURE 1 could be utilized with the recording features of the present invention. For example, the rotating "induction logging" apparatus shown in U.S. Patent No. 3,187,252 granted to E. T. Hungerford on June 1, 1965 could be utilized in place of the televiewer apparatus as a circumferential scanning type of investigating apparatus.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. In a system for recording well logging signals on a recording medium derived from investigating apparatus moved through a borehole wherein a recurrent event signal representing a recurrent well logging event is also generated, a method of synchronizing the recording system with the recurrent event signal, comprising:

(a) generating a light output;
(b) sweeping the light output across the recording medium;
(c) generating a light position signal when the sweeping light has a given direction; and
(d) controlling the sweep of the sweeping light in response to the recurrent event signal and the light position signal so that the recurrent event signal and the light position signal will have a substantially fixed time relationship to one another.

2. The method of claim 1 wherein the step of controlling the sweep includes comparing the time relationship of the event signal to the light position signal and adjusting the frequency of the sweep until the event and light position signals form a desired substantially fixed time relationship to one another.

3. A method of recording well logging signals derived from investigating apparatus moved through a borehole wherein a recurrent event signal representative of a recurrent well logging event is also generated, comprising:

(a) moving a recording medium as a function of borehole depth;
(b) generating a light output;
(c) modulating the light output with representations of the well logging signals;
(d) sweeping at least a portion of the modulated light across the recording medium;
(e) generating a light position signal when the sweeping modulated light has a given direction; and
(f) controlling the sweep of the sweeping means in response to the recurrent event signal and the light position signal so that the recurrent event signal and the light position signal will have a substantially fixed time relationship to one another.

4. A method of recording well logging signal derived from investigating apparatus of the type which periodically transmits energy into the earth formations and receives energy therefrom, and sends signals representative of the transmitted and received energy to the surface of the earth, comprising:

(a) moving a recording medium as a function of borehole depth;
(b) generating a light output;
(c) modulating the light output with representations of the well logging signals;

(d) sweeping at least a portion of the modulated light across the recording medium;
(e) generating a light position signal when the sweeping light has a given direction; and
(f) controlling the sweep of the sweeping light in response to the transmitted energy signal received at the surface of the earth and the light position signal so that the recurrent transmitted energy signal and the light position signal will have a substantially fixed time relationship to one another.

5. A method of recording well logging signals derived from investigating apparatus of the type in which a sensing means is rotated as the investigating apparatus is moved through a borehole and an azimuth signal is generated each time the sensing means has a given azimuthal direction, comprising:
(a) moving a recording medium as a function of borehole depth;
(b) generating a light output;
(c) modulating the light output with representations of the well logging signals;
(d) sweeping at least a portion of the modulated light across the recording medium;
(e) generating a light position signal when the sweeping light has a given direction; and
(f) controlling the sweep of the sweeping light in response to the azimuth signal and the light position signal so that the recurrent azimuth signal and the light position signal will have a substantially fixed time relationship to one another.

6. In a system for recording well logging signals on a recording medium derived from investigating apparatus moved through a borehole wherein a recurrent event signal representing a recurrent well logging event is also generated, apparatus for synchronizing the recording system with the recurrent event signal, comprising:
(a) a light source;
(b) rotatable means for sweeping the light from the light source in a given path;
(c) means responsive to a given direction of the sweeping light for generating a light position signal; and
(d) control means responsive to the recurrent event signal and the light position signal for controlling the rotation of the rotatable means so that the recurrent event signal and the light position signal will have a substantially fixed relationship to one another.

7. The apparatus of claim 6 wherein the means responsive to a given direction of the sweeping light comprises a light sensitive device for generating an electrical signal upon the sweeping light impinging on the light sensitvie device.

8. The apparatus of claim 6 wherein the rotatable means includes:
(1) rotatable optical means adapted for sweeping the light across the recording medium;
(2) an electrical motor for rotating the rotatable optical means; and the control means includes:
  (a) an electrical power source for energizing the motor; and
  (b) means responsive to the time relationship of the recurrent event signal and the light position signal for supplying a control signal to the electrical power source for adjusting a parameter of the electrical power source so that the recurrent event signal and the light position signal will have a substantially fixed time relationship to one another.

9. The apparatus of claim 8 wherein the electrical motor is a synchronous motor and the power source is a variable frequency alternating current source, the control signal being utilized to vary the frequency of the power source to provide said substantially fixed time relationship.

10. Apparatus for recording well logging signals derived from investigating apparatus moved through a borehole wherein a recurrent event signal representing a recurrent well logging event is also generated, comprising:
(a) a recording medium for producing a recording as a function of borehole depth;
(b) a light source operable in response to well logging signals for producing a modulated light output representative of such well logging signals;
(c) rotatable means for sweeping at least a portion of the modulated light across the recording medium;
(d) means for generating a light position signal when the sweeping light has a given direction; and
(e) means responsive to the recurrent event signal and the light position signal for controlling the rotation of the rotatable means so that the recurrent event signal and the light position signal will have a substantially fixed relationship to one another.

11. The apparatus of claim 10 wherein the rotatable means includes:
(1) a rotatable mirror disposed optically between the light source and recording medium and adapted to be rotated so as to sweep the modulated light across the recording medium;
(2) a rotatable refracting medium disposed optically between the light source and the recording medium and adapted to be rotated, the light passing between the light source and the recording medium passing both though the refracting medium and reflecting off of the mirror; and the means for generating a light position signal comprises a light sensitive device located on the recording medium side of both the rotating mirror and refracting medium and positioned so as to intercept at least a portion of the sweeping light at a given position of its sweep across the recording medium.

12. The apparatus of claim 10 and further including a constant intensity light source, the rotatable means sweeping the constant intensity light parallel with the modulated light; and the means for generating a light position signal comprises a light responsive device situated in a position to intercept at least a portion of the sweeping constant intensity light when it has a given direction.

13. The apparatus of claim 10 wherein the means for generating a light position signal includes a light sensitive device located in a position so as to intercept at least a portion of the sweeping modulated light when said sweeping light has a given direction.

14. The apparatus of claim 13 wherein the light source is a glow modulator tube biased to provide a light intensity output even without modulation by the well logging signals, the light changing color with changes in the output light intensity; and further including color sensitive filter means located in a position to filter out light of a given color passing to the recording medium whereby the light output of the glow modulator tube due to the bias level will not produce a recordable image on the recording medium.

15. Apparatus for recording well logging signals derived from investigating apparatus of the type which periodically transmits energy into the earth formations and receives energy therefrom, and sends signals representative of the transmitted and received energy to the surface of the earth, comprising:
(a) a recording medium adapted to be moved as a function of borehole depth;
(b) a light source adapted to be modulated;
(c) means for modulating the light source with representations of the well logging signals;
(d) rotatable means for sweeping at least a portion of the modulated light across the recording medium;
(e) means for generating a light position signal each time the sweeping light has a given direction; and
(f) means responsive to the recurrent signal representative of transmitted energy and the light position signal for controlling the rotation of the rotatable means so that the recurrent transmitted energy signal and the light position signal will have a substantially fixed time relationship to one another.

16. Apparatus for recording well logging signals derived from investigating apparatus of the type in which a sensing means is rotated as the investigating apparatus is moved through a borehole and an azimuth signal is generated each time the sensing means has a given azimuthal direction, comprising:

(a) a recording medium adapted to be moved as a function of borehole depth;

(b) a light source adapted to be modulated;

(c) means for modulating the light source with representations of the well logging signals;

(d) rotatable means for sweeping at least a portion of the modulated light across the recording medium;

(e) means for generating a light position signal when the sweeping light has a given direction; and (f) means responsive to the recurrent azimuth signal and the light position signal for controlling the rotation of the rotatable means so that the recurrent azimuth signal and the light position signal will have a substantially fixed time relationship to one another.

References Cited

UNITED STATES PATENTS

| | | | |
|---|---|---|---|
| Re. 25,928 | 12/1965 | Geyer et al. | 340—18 |
| 3,389,403 | 6/1968 | Cottingham et al. | 346—108 |

JOSEPH W. HARTARY, Primary Examiner

U.S. Cl. X.R.

340—15.5; 346—108, 33